US011920953B2

(12) United States Patent  
Srinivasan

(10) Patent No.: US 11,920,953 B2  
(45) Date of Patent: Mar. 5, 2024

(54) DEVICE FOR DETERMINING ORIENTATION OF AN OBJECT

(71) Applicant: Tilak Srinivasan, Bangalore (IN)

(72) Inventor: Tilak Srinivasan, Bangalore (IN)

( * ) Notice: Subject to any disclaimer, the term of this patent is extended or adjusted under 35 U.S.C. 154(b) by 484 days.

(21) Appl. No.: 17/291,301

(22) PCT Filed: Nov. 6, 2019

(86) PCT No.: PCT/IB2019/059524  
§ 371 (c)(1),  
(2) Date: May 5, 2021

(87) PCT Pub. No.: WO2020/095218  
PCT Pub. Date: May 14, 2020

(65) Prior Publication Data  
US 2022/0003547 A1    Jan. 6, 2022

(30) Foreign Application Priority Data  
Nov. 6, 2018   (IN) .............................. 201841042022

(51) Int. Cl.  
*G01C 9/10*    (2006.01)  
*G01C 9/00*    (2006.01)  
(Continued)

(52) U.S. Cl.  
CPC .................. *G01C 9/10* (2013.01); *G01C 9/00* (2013.01); *G01C 9/08* (2013.01); *G01M 1/122* (2013.01); *G01C 2009/102* (2013.01)

(58) Field of Classification Search  
USPC ....................................................... 702/154  
See application file for complete search history.

(56) References Cited

U.S. PATENT DOCUMENTS

| 8,521,469 B2 * | 8/2013 | Wootten | G01V 11/00 324/207.13 |
| 2008/0106170 A1 * | 5/2008 | Knowles | H10N 30/208 310/328 |

(Continued)

FOREIGN PATENT DOCUMENTS

| DE | 19723069 C1 | 10/1998 |
| EP | 2410355 B1 | 3/2019 |
| WO | WO2019202468 A1 | 10/2019 |

OTHER PUBLICATIONS

International Search Report dated Jul. 22, 2020, in the PCT Application No. PCT/IB2019/059524.

(Continued)

*Primary Examiner* — Paul D Lee  
(74) *Attorney, Agent, or Firm* — Trupti P. Joshi

(57) ABSTRACT

The present disclosure relates to a device (100) for determining orientation of an object (3). The device (100) includes a hollow-spherical enclosure (2) supportable by the object (3) and a plurality of sensors (S1 ... Sn) circumferentially disposed in the hollow-spherical enclosure (2). A gimbal assembly (1) is secured in the hollow-spherical enclosure (2), where at least one gimbal ring of the gimbal assembly (1) is fixed perpendicular to a gravitational weight a gravitational vector (G) of the gimbal assembly (1). Further, at least one light source (8) is secured in the gimbal assembly (1) and the gimbal assembly (1) is configured to align the at least one light source (8) relative to orientation of the object (3) such that, the light emitted by the at least one light source (8) is incident on at least one sensor of the plurality of sensors (S1 ... Sn), to determine orientation of the object (3).

10 Claims, 4 Drawing Sheets

(51) Int. Cl.
*G01C 9/08* (2006.01)
*G01M 1/12* (2006.01)

(56) References Cited

U.S. PATENT DOCUMENTS

| | | | |
|---|---|---|---|
| 2013/0210563 A1* | 8/2013 | Hollinger | A63B 37/0003 473/570 |
| 2013/0326894 A1 | 12/2013 | Miller | |
| 2015/0338215 A1* | 11/2015 | Srinivasan | G01B 5/24 33/365 |
| 2021/0116240 A1 | 4/2021 | Srinivasan | |
| 2022/0003548 A1 | 1/2022 | Srinivasan | |

OTHER PUBLICATIONS

Written Opinion dated Jul. 22, 2020, in the PCT Application No. PCT/IB2019/059524.
Second Written Opinion dated Nov. 23, 2020, in the PCT Application No. PCT/IB2019/059524.
International Preliminary Report on Patentability dated Dec. 29, 2020 in the PCT Application No. PCT/IB2019/059524.

* cited by examiner

DEVICE FOR DETERMINING ORIENTATION OF AN OBJECT

CROSS-REFERENCE TO RELATED APPLICATIONS

The present application is a § 371 national stage application of International Application No. PCT/IB2019/059524, filed Nov. 6, 2019, which claims the benefit of priority from Indian Application No. 201841042022, filed Nov. 6, 2018.

TECHNICAL FIELD

Present disclosure generally relates to the field of measuring devices. Particularly, but not exclusively, the present disclosure relates to a device for determination of orientation of surfaces or that of an object. Further, embodiments of the disclosure, discloses a gimbal based device for determining orientation of the object.

BACKGROUND

Inertial measurements of an object are important in achieving stabilization of the object which is subjected to motion. Conventionally, an array of stabilization systems are used in order to provide stability to a moving object. One such stabilization means utilized in the art may include use of counterweights or counter forces to balance out unbalanced forces. However, such conventional means are futile, as large number of weights are to be used to balance the counter forces, thereby limiting the usage to only small scale applications. With the advancements in technology, gimbals which are compact in size are used in determining inertial movements of objects such as ships and submarines. These gimbals are usually complex in nature and require working spheres which do not interfere with the movement of the gimbal for accurate readings.

Conventionally, gravity based devices or instruments are also widely used in order to measure or determine various parameters such as slope or tilt, elevation or depression and the like of an object. Inclinometers or clinometers are one such instrument used in the measurement of angles of a particular slope, elevation or depression of the object.

Several inclinometers were developed in art, and such inclinometers includes complex construction. These conventional inclinometers are bulky and are cumbersome to be independently handled by a user. Another limitation of such inclinometers may include the sheer size, which may lead to issues with portability of the device. Nowadays, handheld inclinometers are widely used in surveying and measurement tasks. However, many factors affect the use of such handheld inclinometers or in general conventional inclinometers. One such major factor is gravity. These devices may work purely on the gravitational forces to measure a parameters including slope or gradient which are majorly used in land survey. Several other factors that may influence working of the inclinometers may include temperature drifts, vibration, shock, and handling sensitivity.

During operation of such conventional inclinometers, it may be difficult to achieve a steady platform to mount the inclinometers in order to avoid vibration and shocks. This may lead to increase in time for calibrating the inclinometers. Moreover, several conventional analog inclinometers imparted deviation which is more than the acceptable deviation range during recording of the readings. If the same inclinometer is coupled with the gimbal such as a 3-axis gimbal, the whole device would become more complicated and cumbersome to operate.

Since, inclinometers need to be calibrated each and every time before usage, the setting of the gimbal configured with the inclinometers also need to be calibrated, thereby consuming more calibration time. Also, since tilt sensors are provided in the inclinometers, calibration with respect to initial position may be required in order to achieve accurate results. Also, several tilt sensors in the inclinometers may be affected due to magnetic or electromagnetic disturbances and hence further calibration may be required.

The present disclosure is directed to overcome one or more limitations stated above and any other limitations associated with the conventional systems.

SUMMARY OF THE DISCLOSURE

One or more shortcomings of conventional devices or system are overcome, and additional advantages are provided through the provision of a method for determining orientation of an object as disclosed in the present disclosure. Additional features and advantages are realized through the techniques of the present disclosure. Other embodiments and aspects of the disclosure are described in detail herein and are considered a part of the disclosure.

In a non-limiting embodiment of the present disclosure, a device for determining orientation of an object is disclosed. The device includes a hollow-spherical enclosure supportable by the object and a plurality of sensors circumferentially disposed in the hollow-spherical enclosure. A gimbal assembly is secured in the hollow-spherical enclosure, where at least one gimbal ring of the gimbal assembly is fixed perpendicular to an axis along a vector of a gravitational weight of the gimbal assembly. Further, at least one light source is secured in the gimbal assembly and the gimbal assembly is configured to align the at least one light source relative to orientation of the object such that, the light emitted by the at least one light source is incident on at least one sensor of the plurality of sensors, to determine orientation of the object.

In an embodiment of the present disclosure, the gimbal assembly further includes an outer gimbal ring, which is movably mounted within the hollow-spherical enclosure by a gimbal support. A central gimbal ring is pivotally connected to the outer gimbal ring and is concentric with the outer gimbal ring. Also, an inner gimbal ring is fixedly coupled to the central gimbal ring, where the inner gimbal ring is fixed perpendicular the axis along the vector of the gravitational weight of the gimbal assembly.

In an embodiment of the present disclosure, the inner gimbal ring fixed normal to the axis along the vector of the gravitational weight of the gimbal assembly is configured to centrally accommodate the at least one light source.

In an embodiment of the present disclosure, the hollow-spherical enclosure further includes an inner wall, which is configured to accommodate the gimbal assembly at a lowermost portion. An outer wall is displaceable on the object and is configured to circumferentially accommodate the plurality of sensors. Further, at least one sensor of the plurality of sensors on the outer wall optically engages with the at least one light source in the gimbal assembly, on operation of the gimbal assembly relative to displacement of the outer wall, for change in orientation of the object.

In an embodiment of the present disclosure, each sensor of the plurality of sensors is positioned at a predetermined radial distance on the outer wall, to receive the light emitted by the at least one light source, on displacement of the hollow-spherical enclosure.

In an embodiment of the present disclosure, the inner wall of the hollow-spherical enclosure is made from a transparent material, to transmit light for incidence on at least one sensor of the plurality of sensors on the outer wall.

In an embodiment of the present disclosure, each of the plurality of sensors is a photoelectric device.

In an embodiment of the present disclosure, the device comprises a control unit, communicatively coupled each of the plurality of sensors. The control unit is configured to receive a signal based on incidence of light from the at least one light source in the gimbal assembly, on at least one sensor of the plurality of sensors.

In an embodiment of the present disclosure, the control unit is configured to determine orientation of the object, based on change in incidence of light from one of the plurality of sensors to an other sensor of the plurality of sensors.

In an embodiment of the present disclosure, the at least one light source is selected from a group consisting of a laser emitting devices and monochromatic light emitting lamps.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended specification. The disclosure itself, however, as well as a preferred mode of use, further objectives and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
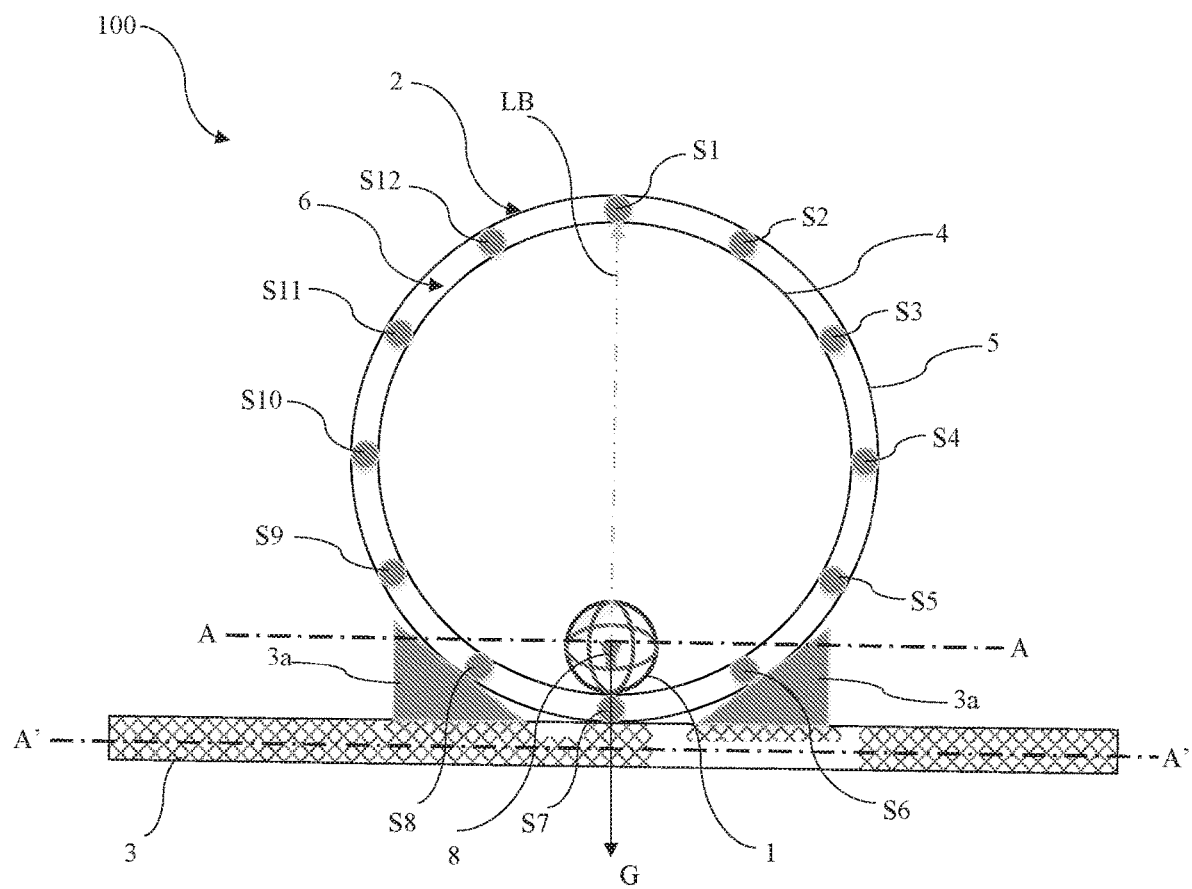
FIG. 1 illustrates a sectional view of a device for determining orientation of an object, in accordance with an exemplary embodiment of the present disclosure.
Figure 3:
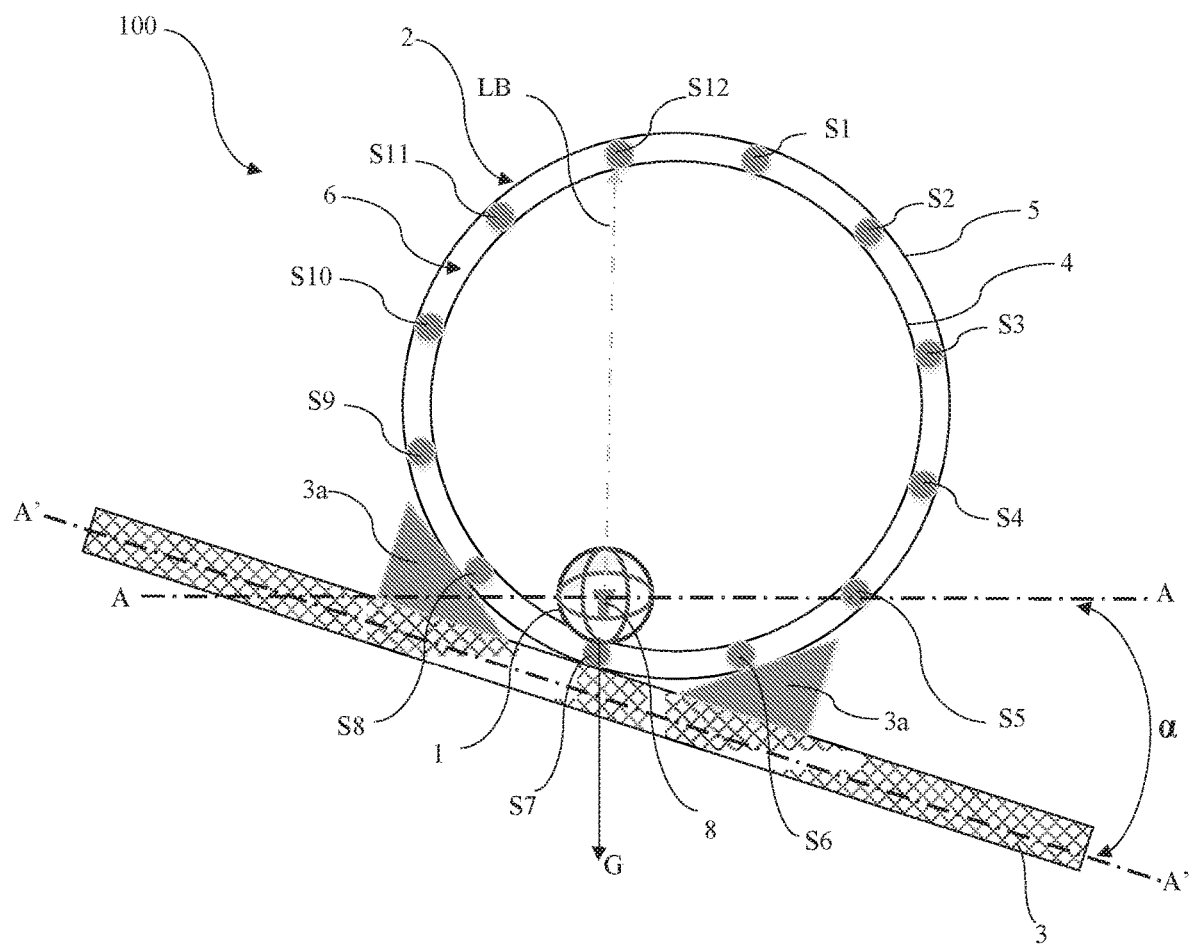

FIG. 3 a sectional view of the device of FIG. 1 in an inclined condition, in accordance with an exemplary embodiment of the present disclosure.

Figure 4:
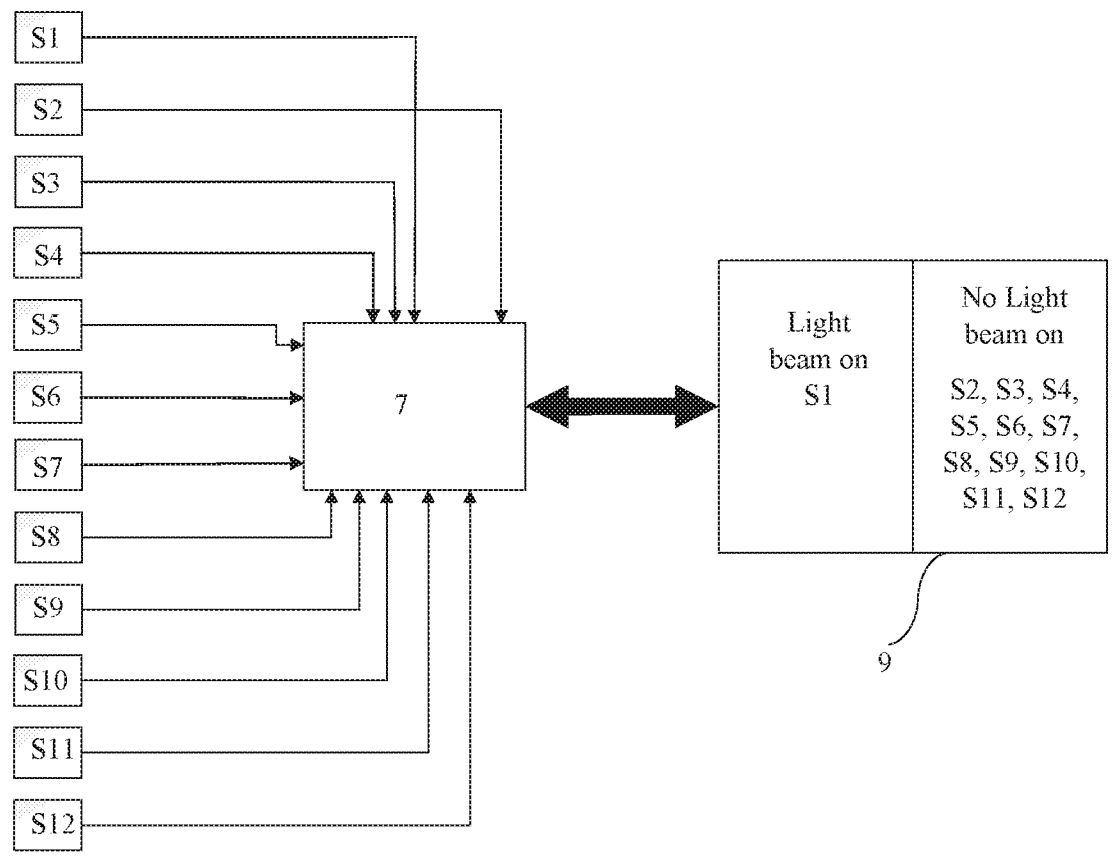

FIG. 4 illustrates a schematic diagram of a plurality of sensors in the device connected to a control unit, in accordance with an exemplary embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the description of the disclosure. It should also be realized by those skilled in the art that such equivalent device which do not depart from the scope of the disclosure. The novel features which are believed to be characteristic of the disclosure, as to a device, together with further objects and advantages will be better understood from the following description, when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a method that comprises a list of acts does not include only those acts but may include other acts not expressly listed or inherent to such a device.

Embodiments of the disclosure discloses a device for determining orientation of an object. The device includes a hollow-spherical enclosure supportable on the object and a plurality of sensors circumferentially disposed in the hollow-spherical enclosure. A gimbal assembly is secured in the hollow-spherical enclosure, where at least one gimbal ring of the gimbal assembly is fixed perpendicular an axis along a vector of a gravitational weight of the gimbal assembly. Further, at least one light source is secured in the gimbal assembly and the gimbal assembly is configured to align the at least one light source relative to orientation of the object such that, the light emitted by the at least one light source is incident on at least one sensor of the plurality of sensors, to determine orientation of the object. This way, orientation of the object can be determined without use of expensive sensors.

In the following description of the embodiments of the disclosure, reference is made to the accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 is an exemplary embodiment of the present disclosure, which illustrates a sectional view of a device (100) for determining orientation of an object (3). The device (100) may be supportable on a surface of the object (3) and, the device (100) may either linearly or angularly displace on the surface of the object (3), relative to change in orientation of the object (3). Further, the device (100) may be positioned on the surface of the object (3) by forming either a point contact or by a line contact such that, the device (100) may suitably incline [that is align with respect to an axis] and/or displace [that is, either roll, pitch or yaw] based on displacement of the object (3). The alignment or inclination of the device (100) relative to displacement of the object (3) may suitably indicate orientation of the object (3).

The device (100) may include a hollow-spherical enclosure (2), which may adaptably be supported on the surface of the object (3). In the illustrative embodiment, the object (3) resembles a platform, on which the hollow-spherical enclosure (2) is positioned and accommodated. The hollow-spherical enclosure (2) is held in a predetermined position by a plurality of stoppers (3a), to restrain linear displacement [movement due to rolling motion] of the hollow-spherical enclosure (2), and in-turn that of the device (100). That is, the device (100) is configured to angularly or obliquely displace or align about a point or axis, based on change in orientation of the object (3). In an embodiment, the hollow spherical enclosure (2) may include two hemispherical members [not shown in figures], which may be assembled by suitable joining process such as, but not limited, to snap fitting, welding, brazing, adhesive bonding, and the like. Upon assembling the two hemispherical members, a seam at a portion of joining may be produced and the hollow-spherical enclosure (2) may be formed.

Further, the hollow-spherical enclosure (2) may include an inner wall (4) defining a hollow section and, an outer wall (5) exposed to the object (3) or to the surroundings, in order to be supported thereabout. The inner wall (4) of the hollow-spherical enclosure (2) may define a hollow region along periphery of inner wall (4). The hollow-spherical enclosure (2) may be made from transparent materials such as, but not limited to, glass, acrylic materials, polymers, and the like such that, the inner wall (4) may at least be optically translucent in order to allow at least a portion of light to traverse through the hollow region and be incident on opposing face of the hollow-spherical enclosure (2). Additionally, the outer wall (5) may be defined with a plurality of provisions [not seen in Figures] to circumferentially accommodate a plurality of sensors (S1 . . . Sn). The plurality of provisions may be removably sealed by means including, but not limited to, a cover plate and an adhesive bonding, to enclose the plurality of sensors (S1 . . . Sn). Each sensor of the plurality of sensors (S1 . . . Sn) may be positioned at a predetermined radial distance on the outer wall (5), to ensure overall circumference of the hollow-spherical enclosure (2) may be covered. In an embodiment, a passage region (6) may be defined between the inner wall (4) and the outer wall (5) such that, the plurality of sensors (S1 . . . Sn) may suitably be disposable in the passage region (6). Also, dimension of the passage region (6) may be reduced to render negligible thickness between the inner wall (4) and the outer wall (5) so that, the plurality of sensors (S1 . . . Sn) can be mounted on either of the inner wall (4) and the outer wall (5).

Figure 2:
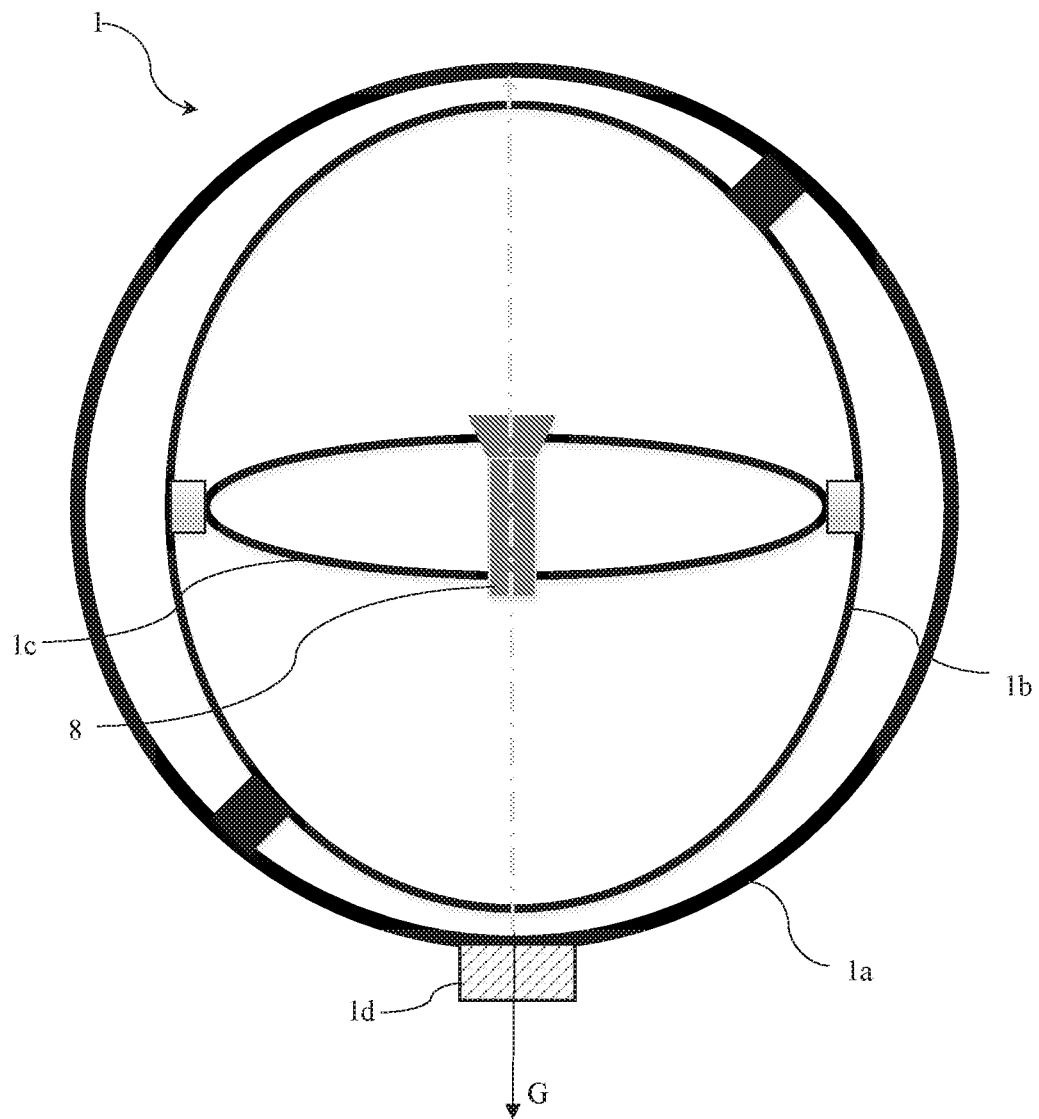
FIG. 2 illustrates a sectional view of a gimbal assembly of the device in FIG. 1.

Further, the inner wall (4) of the hollow-spherical enclosure (2) may accommodate a gimbal assembly (1) within the hollow section defined therein. The gimbal assembly (1) may be movable about a point of contact, particularly, at a lower most point of the inner wall (4) such that, the gimbal assembly (1) may be operable about at least two-degrees of freedom [that is, able to perform at least two of roll, pitch and yaw] to retain center of gravity of the gimbal assembly (1). The gimbal assembly (1), as best seen in FIG. 2, may be supported by a gimbal support (1d), for operation about the at least two degrees of freedom. Further, the gimbal assembly (1) is a three-axis gimbal assembly, and the gimbal assembly (1) may include at least three gimbal rings, namely an outer gimbal ring (1a), a central gimbal ring (1b) and an inner gimbal ring (1c), where each of the gimbal rings may be operable along an axis of the gimbal support (1d). The outer gimbal ring (1a) may be movably mounted within the hollow-spherical enclosure (2) at the gimbal support (1d), while the central gimbal ring (1b) may be concentric with the outer gimbal ring (1a) and may be pivotally connected to the outer gimbal ring (1a). Due to this configuration, the outer gimbal ring (1a) and the central gimbal ring (1b) may be pivotable for operation of the gimbal assembly (1) relative to displacement or alignment of the hollow-spherical enclosure (2). Also, the inner gimbal ring (1c) may be concentric with the central gimbal ring (1b) and may be fixedly coupled to the central gimbal ring (1b). The inner gimbal ring (1c) may be fixed perpendicular to an axis along a vector of a gravitations weight [that is, an imaginary vertical axis defining the weight] of the gimbal assembly (1). By fixing the inner gimbal ring (1c) perpendicular to the axis along the vector of the gravitational weight of the gimbal assembly (1), movement of the gimbal assembly (1) in a vertical direction may be restrained.

In addition, at least one light source (8) may be fixed to the inner gimbal ring (1c) by a suitable support element [not shown in figures] having configuration such as, but not limited to, fastening means, coupling means, adhesive bonding, and the like. The at least one light source (8) may be fixed to the inner gimbal ring (1c) such that, light emitted from the at least one light source (8) may be perpendicularly incident on at least one sensor of the plurality of sensors (S1 . . . Sn) accommodated within the hollow-spherical enclosure (2). Further, to ensure that the light emitted by the at least one light source (8) may be incident on at least one sensor of the plurality of sensors (S1 . . . Sn) and may not be scattered, the at least one light source (8) may positioned in such a way that, light emitted may be in-line with respect to the axis along the vector of the gravitational weight (G) of the gimbal assembly (1). For maintaining the light in-line with respect to the axis along the vector of the gravitational weight (G) of the gimbal assembly (1) and normal to the inner gimbal ring (1c), the inner gimbal ring (1c) may be configured to align with a fixed axis (A-A), when the object (3) is not subjected to displacement or motion. In an embodiment, the at least one light source (8) may be coupled to the gimbal assembly (1) such that, light emitted from the at least one light source (8) may be in-line with the axis along the vector of the gravitational weight (G) of the gimbal assembly (1). By this configuring, light emitted by the at least one light source (8) may remain perpendicular to the fixed axis (A-A) of the inner gimbal ring (1c) and hence, may suitably be incident on at least one sensor of the plurality of sensors (S1 . . . Sn), based on displacement or movement of the object. In the illustrative embodiment, when the object (3) is not in motion or displacement, the at least one light source (8) is aligned to emit light that may be incident on one sensor (S1) of the plurality of sensors (S1 . . . Sn), which may be in-line with the axis along the vector of the gravitational weight (G) of the gimbal assembly (1). Such sensor (S1) which may be configured to receive light when the object (3) may not be in motion or displacement may be designated as a reference sensor for determining orientation of the objection, upon displacement or movement. Also, at the rest condition of the object (3), a horizontal axis (A'-A') of the object (3) may be parallel to the fixed axis of the inner gimbal ring (1c).

In an embodiment, the at least one light source (8) may be a source which produces a narrow beam of light, that may travel through the hollow region of the hollow-spherical enclosure (2) without scattering or dispersion. The plurality of sensors (S1 ... Sn) may be selected from at least one of the photoelectric device (100) so that, each sensor may be sensitive to light and, may be configured to generate feedback signal based on the incidence of light. Also, as the light emitted by the light source (8) may be a narrow beam, only one or some of the sensors of the plurality of sensors (S1 ... Sn) may be incident with the light so that, orientation of the object (3) may be determined based on locus position of the sensor on which the light may be incident. In the illustrative embodiment of FIG. 1, when light or light beam from the at least one light source (8) is incident on any one of the plurality of sensors (S1 ... Sn), then such sensor generates the feedback signal to a control unit (7), which is communicatively coupled with each of the plurality of sensors (S1 ... Sn) to determine orientation of the object (3) [best shown in FIG. 4]. For example, as shown in FIG. 1, when the light from the at least one light source (8) is incident on one sensor (S1) of the plurality of sensors (S1 ... Sn), the control unit (7) based on locus position of the one sensor (S1) may be configured to detect condition of the object (3) as a rest condition. At the rest condition, the control unit (7) may be configured to assess that the fixed axis (A-A) of the inner gimbal ring (1c) may be perpendicular to the axis along the vector of the gravitational weight (G) of the gimbal assembly (1). Also, upon detection of light to be incident on other sensors of the plurality of sensors (S1 ... Sn), the control unit (7) may determine orientation of the object (3) based on angular displacement of the horizontal axis (A'-A') of the object (3) with respect to the axis along the vector of the gravitational weight (G) of the gimbal assembly (1). In an embodiment of the present disclosure, the plurality of sensors (S1 ... Sn) are twelve in number, however, the number of sensors employable in the device (100) may not be construed as a limitation.

Referring now to FIG. 3, the hollow-spherical enclosure (2) of the device (100) supported on the object (3) may be subjected to tilt or inclination. For example, when the object (3) is tilted, the gimbal assembly (1) within the hollow-spherical enclosure (2) may be operated so that, the fixed axis (A-A) of the inner gimbal ring (1c) may be aligned [that is, counter-balanced] perpendicular to the axis along the vector of the gravitational weight (G) of the gimbal assembly (1). This alignment of the gimbal assembly (1) may be performed by pivotal motion of the outer gimbal ring (1a) and the central gimbal ring (1b), relative to the orientation of the object (3). This re-alignment of the inner gimbal ring (1c) of the gimbal assembly (1) ensures that the light emitted from the at least one light source (8) may be in-line with the axis along the vector of the gravitational weight (G) of the gimbal assembly (1) irrespective of orientation of the object (3). Further, due to inclination of the object (3), the horizontal axis (A'-A') of the object (3) may be inclined from the axis along the vector of the gravitational weight (G) of the gimbal assembly (1). Upon such inclination of the object (3), light emitted by the at least one light source (8) and being incident on the reference sensor may be deviated to be incident on other sensor of the plurality of sensors (S1 ... Sn). The control unit (7) may determine orientation of the object (3) based on the locus position of the other sensor of the plurality of sensors (S1 ... Sn) on the hollow-spherical enclosure (2). This way, the device (100) may be employed to detect orientation of the object (3) along three axis of displacement, namely, X-axis, Y-axis and Z-axis, respectively, about which the object (3) may be displace or orient.

For example, an angle (α) is created between the horizontal axis (A'-A') of the object (3) and the fixed axis (A-A) of the inner gimbal ring (1c), which may be calculated to determine the pitch, roll and yaw movement acting on the object (3). This angle (α) may be calculated by application of appropriate mathematical formulae.

Referring now to FIG. 4, as the gimbal assembly (1) displaces from one sensor to another sensor of the plurality of sensors (S1 ... Sn), the control unit (7) may receive a plurality of feedback signals from various sensors (S1 ... Sn). In an embodiment, a first feedback signal maybe received from the first sensor (S1) at the rest condition of the object (3). When the object (3) is subjected to various tilting motions, the gimbal assembly (1) displaces over a number of plurality of sensors (S1 ... Sn). The control unit (7), receives all the feedback signals from the plurality of sensors (S1 ... Sn) to which the light is perpendicularly incident and processes the feedback signals to determine tilting angle and orientation of the object (3).

In an embodiment, at least one display unit (9) may be provided such that, the control unit (7) may be configured to display processed results to a user. This way, the user may be able to determine the various parameters of the orientation of the device (100).

In an embodiment, the hollow-spherical enclosure (2) is transparent, which aids in visual detection of the gimbal assembly (1) within the hollow-spherical enclosure (2).

In an embodiment, the gimbal assembly (1) is at least one of 3-axis brushless gimbals, gyros or any other gimbal (1) that serves the purpose. Further, the gimbal assembly (1) may include a rotating element disposable about the inner gimbal ring (1c) to maintain gyroscopic effect during inclination of the object (3).

In an embodiment, the plurality of stoppers (3a) provided on the object (3) may secure the hollow-spherical enclosure (2) and prevent any unwanted movement of the hollow-spherical enclosure (2) in order to achieve accurate orientation of the gimbal assembly (1) within the hollow-spherical enclosure (2). The plurality of stoppers (3a) are at least one of wedges, retaining blocks and the like.

In an embodiment, the light source (8) may be at least one of a focused laser light source, a laser beam or any other monochromatic light source that serves the purpose.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system (200) having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system (200) having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERICALS

| Numerical | Particulars |
|---|---|
| 100 | device |
| 1 | gimbal assembly |
| 1a | outer gimbal ring |
| 1b | central gimbal ring |
| 1c | inner gimbal ring |
| 1d | gimbal support |
| 2 | hollow-spherical enclosure |
| 3 | object |
| 3a | stoppers |
| 4 | inner wall |
| 5 | outer wall |
| 6 | passage region |
| 7 | control unit |
| 8 | light source |
| 9 | Display unit |
| S1-Sn | Plurality of sensors |

I claim:

1. A device (100) for determining orientation of an object (3), the device (100) comprising:
    a hollow-spherical enclosure (2) supportable on the object (3);
    a plurality of sensors (S1 . . . Sn), circumferentially disposed in the hollow-spherical enclosure (2);
    characterized in that, a gimbal assembly (1) secured in the hollow-spherical enclosure (2), wherein at least one gimbal ring of the gimbal assembly (1) is fixed perpendicular to an axis along a vector of a gravitational weight (G) of the gimbal assembly (1); and
    at least one light source (8) secured to the at least one gimbal ring fixed perpendicular to the axis along a vector of the gravitational weight (G) of the gimbal assembly (1), the at least one light source (8) is configured to emit light along the axis along the vector of the gravitational weight (G) of the gimbal assembly (1), wherein
    the gimbal assembly (1) is configured to align the at least one light source (8) with the axis along the vector of the gravitational weight (G) of the gimbal assembly (1) relative to the orientation of the object (3) such that, the light emitted by the at least one light source (8) is incident on at least one sensor of the plurality of sensors (S1 . . . Sn), to determine orientation of the object (3).

2. The device (100) as claimed in claim 1, wherein the gimbal assembly (1) comprising:
    an outer gimbal ring (1a) movably mounted within the hollow-spherical enclosure (2) by a gimbal support (1d);
    a central gimbal ring (1b), pivotally connected to the outer gimbal ring (1a), wherein the central gimbal ring (1b) is concentric with the outer gimbal ring (1a); and
    an inner gimbal ring (1c) fixedly coupled to the central gimbal ring (1b), wherein the inner gimbal ring (1c) is fixed perpendicular the axis along the vector of the gravitational weight (G) of the gimbal assembly (1).

3. The device (100) as claimed in claim 2, wherein the inner gimbal ring (1c) fixed perpendicular to the axis along the vector of the gravitational weight (G) of the gimbal assembly (1) is configured to centrally accommodate the at least one light source (8).

4. The device (100) as claimed in claim 1, wherein the hollow-spherical enclosure (2) comprising:
    an inner wall (4), configured to accommodate the gimbal assembly (1) at a lowermost portion; and
    an outer wall (5) displaceable on the object (3), the outer wall (5) is configured to circumferentially accommodate the plurality of sensors (S1 . . . Sn),
    wherein at least one sensor of the plurality of sensors (S1 . . . Sn) on the outer wall (5) optically engages with the at least one light source (8) in the gimbal assembly (1), on operation of the gimbal assembly (1) relative to displacement of the outer wall (5), for a change in orientation of the object (3).

5. The device (100) as claimed in claim 4, wherein each sensor of the plurality of sensors (S1 . . . Sn) is positioned at a predetermined radial distance on the outer wall (5).

6. The device (100) as claimed in claim 5, wherein each of the plurality of sensors (S1 . . . Sn) is a photoelectric device (100).

7. The device (100) as claimed in claim 4, wherein the inner wall (4) of the hollow-spherical enclosure (2) is made from a transparent material, to transmit light for incidence on at least one sensor of the plurality of sensors (S1 ... Sn) on the outer wall (5).

8. The device (100) as claimed in claim 1, further comprising a control unit (7), communicatively coupled to each of the plurality of sensors (S1 ... Sn), wherein the control unit (7) is configured to receive a signal based on incidence of light from the at least one light source (8) from at least one sensor of the plurality of sensors (S1 ... Sn).

9. The device (100) as claimed in claim 8, wherein the control unit (7) is configured to determine orientation of the object (3), based on change in incidence of light from one of the plurality of sensors (S1 ... Sn) to an other sensor of the plurality of sensors (S1 ... Sn).

10. The device (100) as claimed in claim 1, wherein the at least one light source (8) is selected from a group consisting of laser emitting devices and monochromatic light emitting lamps.

* * * * *